Dec. 29, 1931.     J. SERRES     1,838,874
WINDING IMPLEMENT
Filed Aug. 29, 1929
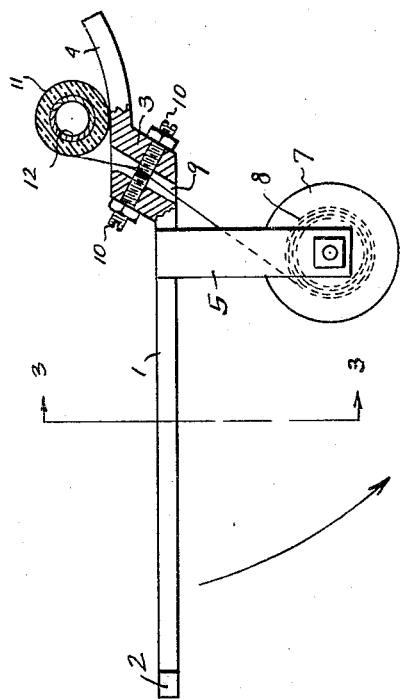
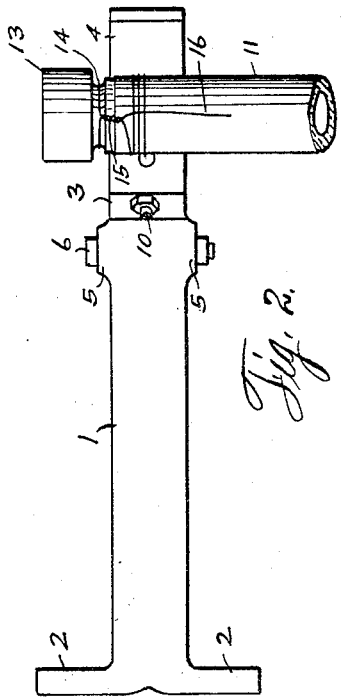
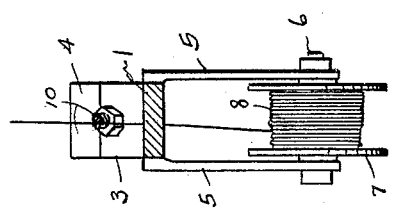
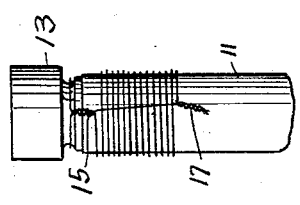
Inventor
John Serres
By
Hardway Cather
Attorneys Patented Dec. 29, 1931

1,838,874

UNITED STATES PATENT OFFICE

JOHN SERRES, OF HOUSTON, TEXAS

WINDING IMPLEMENT

Application filed August 29, 1929. Serial No. 389,168.

This invention relates to new and useful improvements in a winding implement.

One object of the invention is to provide an implement of the character described whereby wire, cords and the like may be wound onto an object.

A more particular object of the invention is to provide an implement of the character described whereby a wire may be wound spirally on a hose end to take the place of the conventional hose clamp whereby a connection may be secured to the end of the hose.

A further feature of the invention resides in the provision of a winding implement of the character described equipped with means for varying the tension of the wire or cord as it is wound.

A still further feature of the invention resides in the provision of a hand operated winding implement equipped with means for storing the wire or cord to be wound on the implement and having feeding means for regulating the feed of the wire or cord from said storage means.

With the above and other objects in view the invention has particular relation to certain novel features of construction, operation and arrangement of parts, an example of which is given in this specification and illustrated in the accompanying drawings, wherein:—

Figure 1 shows a side elevation of the implement partly in section.

Figure 2 shows a plan view thereof.

Figure 3 shows a sectional view taken on the line 3—3 of Figure 1, and

Figure 4 shows an elevation of a hose end with the wire clamp thereon as wound by said implement.

Referring now more particularly to the drawings wherein like numerals of reference designate similar parts in each of the figures, the numeral 1 designates the handle of the implement which, at one end, is provided with the hand grips 2, 2. At the other end of the handle there is an offset thickened shank 3 and beyond said shank there is an arcuate runner 4, said handle, shank and runner being preferably formed integral. The handle 1 has the outstanding side arms 5, 5 disposed substantially parallal and spaced apart and preferably formed integrally with said handle. The outer ends of these arms support a bearing rod as 6 on which there is a spool 7 located between said arms and rotatably mounted. The wire 8 to be used is stored on this spool and is fed through a diagonal channel 9 through the shank. There are the oppositely disposed tension screws 10 threaded through the shank and whose inner ends project into said channel and register, said inner ends forming jaws between which the wire 8 passes as it is fed to the work. These jaws clamp the wire so that it may be fed under tension and this tension may be regulated by adjusting said screws 10.

The numeral 11 designates a hose into the free end of which the shank 12 of the connection 13 is fitted. The connection is usually secured to the hose by a conventional clamp which is fitted around the outer side of the hose and secured thereon by clamp bolts. The conventional type of clamp now employed can not be made to clamp the hose uniformly all the way around and for that reason permits a certain amount of leakage between the hose and shank 12 and furthermore the clamp bolts used are usually cumbersome and form unsightly projections on the end of the hose. With the implement herein described, wire may be securely wrapped about a hose to take the place of the clamp just above described. In applying the wire to the hose, the wire is drawn through the channel 9 and formed into a loop 14 about the neck of the connection 13 and the wire strands are then twisted together as at 15 and the free end of the wire 16 is then longitudinally laid along the hose as shown in Figure 2. The handle 1, is then revolved about the hose the concaved side of the runner 4 riding against the periphery of the hose and the wire will be wound helically about the hose and overlapping the free end 16 of the wire and when a sufficient number of turns of the wire have been fed onto the hose, the free end 16 is twisted about the other strand of the wire forming the twist or knot 17 and said strand is then cut off and the work is completed.

The drawings and description disclose what is now considered to be a preferred form of the invention by way of illustration only, while the broad principle of the invention will be defined by the appended claims.

What I claim is:—

1. A winding implement including a handle, a single runner thereon adapted to bear against one side only of the work, a means on the handle for storing a wrapping element, said implement having a feed channel for said element adjustable tension screws having confronting ends between which the wrapping element passes said screws forming a tensioning device associated with said channel.

2. A winding implement including a handle, a runner forming a bearing member, said implement having a feed channel; tensioning means associated with said channel and comprising oppositely arranged tension screws whose inner ends form jaws which frictionally engage the wrapping element, a rotatable storage spool associated with the handle, and adapted for the storage of a wrapping element thereon.

In testimony whereof I have signed my name to this specification.

JOHN SERRES.